US009237107B2

(12) United States Patent
Ansari et al.

(10) Patent No.: US 9,237,107 B2
(45) Date of Patent: Jan. 12, 2016

(54) FAIR QUANTIZED CONGESTION NOTIFICATION (FQCN) TO MITIGATE TRANSPORT CONTROL PROTOCOL (TCP) THROUGHPUT COLLAPSE IN DATA CENTER NETWORKS

(75) Inventors: Nirwan Ansari, Montville, NJ (US); Yan Zhang, Harrison, NJ (US)

(73) Assignee: NEW JERSEY INSTITUTE OF TECHNOLOGY, Newark, NJ (US)

(*) Notice: Subject to any disclaimer, the term of this patent is extended or adjusted under 35 U.S.C. 154(b) by 550 days.

(21) Appl. No.: 13/297,101

(22) Filed: Nov. 15, 2011

(65) Prior Publication Data

US 2013/0124753 A1    May 16, 2013

(51) Int. Cl.
G06F 15/16 (2006.01)
H04L 12/825 (2013.01)
H04L 12/835 (2013.01)

(52) U.S. Cl.
CPC .............. *H04L 47/263* (2013.01); *H04L 47/30* (2013.01); *Y02B 60/31* (2013.01)

(58) Field of Classification Search
CPC ..................................................... H04L 47/263
USPC ........................................................ 709/235
See application file for complete search history.

(56) References Cited

U.S. PATENT DOCUMENTS

| 5,784,358 | A | 7/1998 | Smith et al. |
| 6,633,579 | B1 | 10/2003 | Tedijanto et al. |
| 6,937,678 | B2 | 8/2005 | Abel |
| 7,340,505 | B2 | 3/2008 | Lisiecki et al. |
| 7,483,374 | B2 | 1/2009 | Nilakantan et al. |
| 7,724,636 | B2 | 5/2010 | Tseng et al. |
| 7,808,913 | B2 | 10/2010 | Ansari et al. |
| 7,948,881 | B2 | 5/2011 | Alharbi et al. |
| 7,969,881 | B2 | 6/2011 | Ansari et al. |
| 2006/0020560 | A1 | 1/2006 | Rodriguez et al. |
| 2006/0149753 | A1 | 7/2006 | Medard et al. |
| 2007/0268828 | A1 | 11/2007 | Peng |
| 2008/0320104 | A1 | 12/2008 | Turner et al. |
| 2009/0143872 | A1 | 6/2009 | Thiele et al. |
| 2009/0198825 | A1 | 8/2009 | Miller et al. |
| 2009/0248898 | A1 | 10/2009 | Gkantsidis et al. |
| 2010/0128605 | A1* | 5/2010 | Chavan et al. ............. 370/230.1 |

(Continued)

OTHER PUBLICATIONS

Nagle et al., "The Panasas ActiveScale Storage Cluster: Delivering Scalable High Bandwidth Storage," in SC'04: Proceedings of the 2004 ACM/IEEE conference on Supercomputing, Washington DC, USA, 2004, 10 pgs.

(Continued)

*Primary Examiner* — Joon H Hwang
*Assistant Examiner* — S. L.
(74) *Attorney, Agent, or Firm* — Turk IP Law, LLC

(57) ABSTRACT

Technologies are generally described for an enhanced Quantized Congestion Notification (QCN) congestion control approach, referred to as Fair QCN (FQCN) for enhancing fairness of multiple flows sharing link capacity in a high bandwidth, low latency data center network. QCN messages may be fed back to flow sources (e.g., servers) which send packets with a sending rate over their share of the bottleneck link capacity. By enabling the flow sources to regulate their data traffic based on the QCN messages from a congestion control component, the queue length at the bottleneck link may converge to an equilibrium queue length rapidly and TCP throughput performance may be enhanced substantially in a TCP incast circumstance.

35 Claims, 7 Drawing Sheets

(56) References Cited

U.S. PATENT DOCUMENTS

| | | |
|---|---|---|
| 2011/0026426 A1 | 2/2011 | Kirisawa |
| 2011/0026429 A1 | 2/2011 | Ben Slimane et al. |
| 2011/0087799 A1 | 4/2011 | Padhye et al. |

OTHER PUBLICATIONS

Phanishayee et al., "Measurement and analysis of TCP throughput collapse in cluster-based storage systems,"Parallel Carnegie Mellon University, CMU-PDL-07-105, Sep. 2007Data Laboratory Carnegie Mellon University Pittsburgh, PA 15213-3890, 16 pgs.

Dean et al., "MapReduce: simplified data processing on large clusters," Commun. ACM, vol. 51, No. 1, pp. 1-13.

Chen et al., "Understanding TCP incast throughput collapse in datacenter networks," WREN'09, Aug. 21, 2009, Barcelona, Spain. Copyright 2009 ACM 978-1-60558-443-0/09/08. pp. 73-82.

Vasudevan et al., "Safe and effective fine-grained TCP retransmissions for datacenter communication," SIGCOMM'09, Aug. 17-21, 2009, Barcelona, Spain. Copyright 2009 ACM 978-1-60558-594-9/09/08. pp. 303-314.

Gur et al. "Exploring the Issues in Policy-Based Approaches for QoS Support in 3G+ Mobile Networks" (IEEE) 2005, Department of Computer Engineering, Boğaziçi University, Turkey; Department of Electrical Engineering, United Arab Emirates University, UAE.

Jiang et al. So-In, "An Explicit Rate Control Framework for Lossless Etherent Operation," in International Conference Department of Computer Science and Engineering, Washington University in Saint Louis, 5 pages.

So-In et al., "Enhanced Forward Explicit Congestion Notification (E-FECN) Scheme for Datacenter Ethernet Networks," Department of Computer Science and Engineering, Washington University in St. Louis, 5 pages.

Alizadeh et al., "Data Center Transport Mechanisms: Congestion Control Theory and IEEE Standardization," Forty-Sixth Annual Allerton Conference, Allerton House, UIUC, Illinois, USA, Sep. 23-26, 2008.

Jiang et al., "Analysis of Backward Congestion Notification (BCN) for Ethernet in Datacenter Applications," Department of Computer Science and Engineering, Washington University in Saint Louis. 10 pages.

Ghemawat et al., "The google file system," SOSP'03, Oct. 19-22, 2003, Bolton Landing, New York, USA. Copyright 2003 ACM 1-58113-757-5/03/0010.

"Ethernet flow control," http://en.wikipedia.org/wiki/Ethernet_flow_control[Nov. 17, 2011 5:41:50 PM], 3 pages.

Vishwanath et al., "Perspectives on router buffer sizing: recent results and open problems," ACM SIGCOMM Computer Communication Review, vol. 39, No. 2, Apr. 2009, pp. 34-39.

Kabbani, et al., "AF-QCN: Approximate Fairness with Quantized Congestion Notification for Multi-tenanted Data Centers" System IP Core Research Laboratories, NEC Coporation, Japan, Cisco Systems, San Jose, California, 2010 18th IEEE Symposium on High Performance Interconnects,pp. 58-65.

"QCN pseudo-code version 2.0," Definition—Variables, retrieved at http://www.ieee802.org/1/files/public/docs2008/au-rong-qcn-serial-hai-pseudo-code%20rev2.0.pdf, pp. 8.

"Series G: Transmission Systems and Media, Digital Systems and Networks," International Telecommunication Union, Broadband optical access systems based on Passive Optical Networks (PON), ITU-T Recommendation G.983.1, pp. 60 (2005).

"Series G: Transmission Systems and Media, Digital Systems and Networks," International Telecommunication Union, Gigabite-capable passive optical networks (PON), ITU-T Recommendation G.984.1, pp. 22 (2003).

Ahlswede, R., et al., "Network information flow," IEEE Transactions on Information Theory, vol. 46, No. 4, pp. 1204-1216 (2000).

Assi, C.M., et al., "Dynamic Bandwidth Allocation for Quality-of-Service Over Ethernet PONs," IEEE Journal on Selected Areas in Communications, vol. 21, No. 9, pp. 1467-1477 (2003).

Banerjee, A., et al., "Fair Sharing Using Dual Service-Level Agreements to Achieve Open Access in a Passive Optical Network," IEEE Journal on Selected Areas in Communications, vol. 24, No. 8, pp. 32-44 (2006).

Banerjee, A., et al., et al., "Wavelength-division-multiplexed passive optical network (WDM-PON) technologies for broadband access: a review [Invited]," Journal of Optical Networking, pp. 737-758, vol. 4, No. 11, Optical Society of America (2005).

Bergamasco, D., "Data Center Ethernet Congestion Management: Backward Congestion Notification," in IEEE. 802.1 Interim Meeting, Berlin, Germany, pp. 1-25 (2005).

Bubnicki, Z.., "Modern Control Theory," pp. 55-60, Spring (2005).

Byun, H-J., et al., "Dynamic bandwidth allocation algorithm in Ethernet passive optical networks," IEEE Electronic Letters, vol. 39, No. 13, pp. 1001-1002 (2003).

Chiu, D.M., et al., "Can Network Coding Help in P2P Networks?," 4th International Symposium on Modeling and Optimization in Mobile, Ad Hoc and Wireless Networks, pp. 1-5 (2006 ).

Fonseca, J., et al., "BitTorrent Protocol—BTP/1.0," accessed at http://web.archive.org/web/20111025202046/http://jonas.nitro.dk/bittorrent/bittorrent-rfc.html, accessed on Feb. 12, 2014, pp. 1-12.

Fragouli, C., et al., "Wireless Network Coding: Opportunities & Challenges," Military Communications Conference, MILCOM, pp. 1- 8, IEEE (2007).

Gkantsidis, C., et al., "Anatomy of a P2P Content Distribution System with Network Coding," IPTPS'06, pp. 1-6 (2006).

Gkantsidis, C., et al., "Avalanche: File Swarming with Network Coding," accessed at http://web.archive.org/web/20110805143013/http://research.microsoft.com/en-us/projects/avalanche/default.aspx, accessed on Feb. 12, 2014, pp. 1-2.

Gkantsidis, C., et al., "Comprehensive View of a Live Network Coding P2P system," Proceedings of the 6th ACM SIGCOMM conference on Internet measurement, pp. 177-188 (2006).

Gkantsidis, S., and Rodriguez, P.R., et al., Network coding for Large Scale Content Distribution, Proceedings IEEE INFOCOM 2005. 24th Annual Joint Conference of the IEEE Computer and Communications Societies, vol. 4, pp. 2235-2245 (2005).

Gummalla, A., et al., "MPCP—State of the Art," IEEE 802.3ah, Interim, Raleigh NC, pp. 1-5 (Jan. 2002).

Hellerstein, J.L., et al., "Feedback Control of Computing Systems," Chapter 10, pp. 337-374, Wiley-Interscience (2004).

Hollot, C.V., et al., "A Control of Theoretic Analysis of RED," IEEE Twentieth Annual Joint Conference of the IEEE Computer and Communications Societies. Proceedings, vol. 3, pp. 1510-1519 (2001).

Kim K.Y., et al., "Optimal rate based flow control ABR services in ATM Networks," Proceedings of the IEEE Region 10, vol. 1, pp. 773-776 (1999).

Kramer, G., et al., "IPACT: A Dynamic Protocol for an Ethernet PON (EPON)," IEEE Communications Magazine, vol. 40, No. 2, pp. 74-80 (2002).

Legout, A., et al., "Rarest First and Choke Algorithms are Enough," Proceedings of the 6th ACM SIGCOMM Internet Measurement Conference, pp. 203-216 (2006).

Li, et al., "Linear network coding," IEEE Transactions on Information Theory, Feb. 2003, pp. 371-381, vol. 49, IEEE, New York City, New York, USA.

Luo, Y., and Ansari, N., "Bandwith allocation for multiservice access on EPONs," IEEE Optical Communications, vol. 43, Issue 2, pp. S16-S32 (2005).

Luo, Y., and Ansari, N., et al., "Limited sharing with traffic prediction for dynamic bandwith allocation and QoS provisioning over Ethernet passive optical networks," Journal of Optical Networking, vol. 4, No. 9, pp. 561-572, Optical Society of America (2005).

Luo, Y., et al., "Resource Management for Broadband Access over Time-Division Multiplexed Passive Optical Networks," IEEE Network, vol. 21, Issue 5, pp. 20-27, IEEE (2007).

Ma, M., et al., "A Bandwith Guaranteed Polling MAC Protocol for Ethernet Passive Optical Networks," Twenty-Second Annual Joint Conference of the IEEE Computer and Communications. IEEE Societies, vol. 1, pp. 22-31 (2003).

(56) References Cited

OTHER PUBLICATIONS

Naser, H., and Mouftah, H.T., "A Joint-ONU interval-based dynamic schedulig algorithm for Ethernet passive optical networks," ICCC/ACM Transactions on Networking, vol. 14, No. 4, pp. 889-899 (2006).

Qiu, D., and Srikant, R., et al., "Modeling and Performance Analysis of BitTorrent-Like Peer-to-Peer Networks," Proceedings of the 2004 conference on Applications, technologies, architectures, and protocols for computer communications, ACM Sigcomm, pp. 367-378 (2004).

Shami, A., et al., "Jitter Performance in Ethernet Passive Optical Networks," Journal of Lightwave Technology, vol. 23, No. 4, pp. 1745-1753 (2005).

Sherif, S.R., et al., "A Novel Decentralized Ethernet-Based PON Access Architecture for Provisioning Differentiated QoS," Journal of Lightwave Technology, vol. 22, No. 11, pp. 2483-2497 (2004).

"So-In, C., "Enhanced Forward Explicit Congestion Notification (E-FECN) Scheme for Datacenter Ethernet Networks," International Symposium on Performance Evaluation of Computer andTelecommunucation Systems (SPECTS'08), pp. 542-546 (2008)".

Wang, N., "Downloader-Initiated Random Linear Network Coding for Peer-to-Peer File Sharing," IEEE System Journal, vol. 5, Issue 1, pp. 61-69 (2011).

Willinger, W., et al., "Self-Similarity Through High-Variability: Statistical Analysis of Ethernet LAN Traffic at the Source Level," IEEE/ACM Transactions on Networking, vol. 5, Issue 1, pp. 71-86, IEEE (1997).

Yin, S., et al., "NXG02-3: Bandwith Allocation on EPONs: A Controllability Perspective," Global Telecommunications Conference, pp. 1-5, IEEE (2006).

Yin, S., et al., "Stability of Predictor Based Dynamic Bandwidth Allocation over EPONs," IEEE Communications Letters, vol. 11, No. 6, pp. 549-551, IEEE (2007).

Zhang, L., et al., "Dual DED-GPS scheduler for delay-constraint applications in Ethernet passive optical networks," IEICE Transactions on Communications, vol. E86-B, No. 5, pp. 1575-1584 (2003).

Zhang, Y., and Ansari, N, "On Mitigating TCP Incast in Data Center Networks," Proceedings IEEE INFOCOM, pp. 1-9 (2011).

Kramer, G., et al., "Ethernet PON (ePON): Design and Analysis of an Optical Access Network," Photonic Network Communications, vol. 3, Issue 3, pp. 307-319, Kluwer Academic Publishers (2001).

Office Action received for U.S. Appl. No. 12/420,724, mailed May 8, 2014 and filed on Apr. 8, 2009.

Bergamasco, D., and Pan. R., "Backward Congestion Notification Version 2.0," in IEEE 802.1 Meeting, pp. 1-39, (Seember 2005).

IEEE Computer Society, Part 3: Carrier Sense Multiple Access with Collision Detection (CSMAICD) Access Method and Physical Layer Specifications, IEEE-SA Standards Board, 2004.

Final Office Action for Application No. 12/420,724, mailed Nov. 14, 2014. Filed Apr. 8, 2009.

\* cited by examiner

FAIR QUANTIZED CONGESTION NOTIFICATION (FQCN) TO MITIGATE TRANSPORT CONTROL PROTOCOL (TCP) THROUGHPUT COLLAPSE IN DATA CENTER NETWORKS

BACKGROUND

Unless otherwise indicated herein, the materials described in this section are not prior art to the claims in this application and are not admitted to be prior art by inclusion in this section.

Datacenters are typically composed of storage devices, servers and switches to interconnect the servers within datacenters. Data may be spread across or striped across many servers for performance or reliability reasons. During data access from servers, the data need to pass through datacenter Ethernet switches. The switches typically have small buffers in the range of 32-256 KB, which may be overflowed at congestions. Transport Control Protocol (TCP) throughput collapse phenomenon is referred to as TCP incast and attributed to having multiple senders overwhelming a switch buffer, thus resulting in TCP timeout due to packet drops at the congestion switch. TCP incast may also occur in distributed cluster storage and web-search workloads. Increasing the amount of buffer size can delay the onset of incast. However, any particular switch configuration may have a maximum number of servers involved in simultaneous transmissions prior to incurring throughput collapse.

The main root cause of the TCP incast is due to the packets drops at the congestion switch that result in TCP timeout. Congestion control algorithms that have been developed to reduce or remove packets drops at the congestion switch include, but are not limited to, Backward Congestion Notification (BCN), Forward Explicit Congestion Notification (FECN), the enhanced FECN (E-FECN), and Quantized Congestion Notification (QCN). Among those, BCN achieves proportional fairness but not maxmin fairness. FECN and E-FECN can achieve perfect fairness, but the control message overhead is high. The QCN algorithm aims to provide congestion control at the Ethernet Layer or Layer 2 (L2) in standardized data center networks. QCN can effectively control link rates very rapidly in a datacenter environment.

The present disclosure appreciates that TCP incast, where TCP throughput drastically reduces when multiple sending servers communicate with a single receiver separated by one or more switches or routers in high bandwidth, low latency networks using TCP, potentially arises in many datacenter applications. Algorithms intended to enhance data center network performance such as QCN, however, perform poorly when TCP incast is observed, due to the rate unfairness of different flows.

SUMMARY

The present disclosure generally describes techniques for mitigating transport control protocol (TCP) throughput collapse in data center networks through Fair Quantized Congestion Notification (FQCN).

Some embodiments are directed to a data center network for controlling data traffic congestion. The data center network may include multiple reaction points configured to send data packets at a sending rate over respectively assigned shares of link capacity and a congestion point receiving data traffic from the plurality of reaction points. The congestion point may monitor packet arrival rate from each reaction point and feed congestion messages to the reaction points, the messages including a congestion severity parameter for enabling the reaction points to regulate the respective sending rates of the reaction points.

Other embodiments are directed to a method for controlling data traffic congestion at a data center network. The method may include receiving data packets from a plurality of reaction points at a sending rate over respectively assigned shares of link capacity; monitoring packet arrival rate from each reaction point at a congestion point receiving data traffic from the plurality of reaction points; and feeding congestion messages to the reaction points, the messages including a congestion severity parameter for enabling the reaction points to regulate the respective sending rates of the reaction points.

Further embodiments are directed to a congestion control component for a data center network capable of controlling data traffic congestion. The congestion control component may include a switch configured to receive data packets from a plurality of servers at a sending rate over respectively assigned shares of link capacity, monitor packet arrival rate from each server, and feed congestion messages to the server, the messages including a congestion severity parameter for enabling the servers to regulate the respective sending rates of the servers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
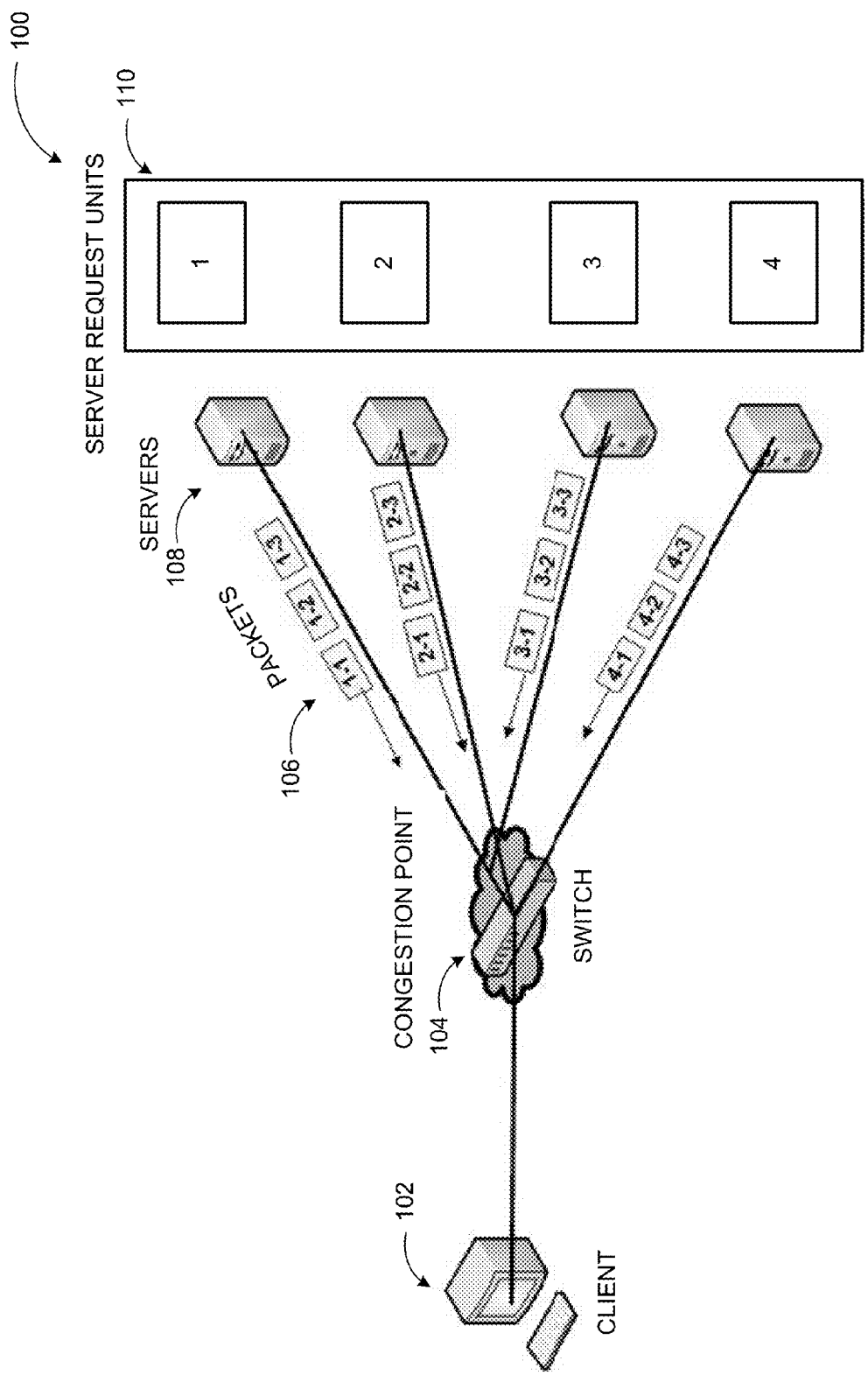
FIG. 1 illustrates an example TCP incast network setting with one client requesting data from multiple servers through synchronized reads.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to mitigating transport control protocol (TCP) throughput collapse in data center networks through Fair Quantized Congestion Notification (FQCN).

Briefly stated, an enhanced Quantized Congestion Notification (QCN) congestion control approach, referred to as Fair QCN (FQCN) for enhancing fairness of multiple flows sharing link capacity in a high bandwidth, low latency data center network. In a system according to embodiments, QCN messages may be fed back to flow sources (e.g., servers) which send packets with a sending rate over their share of the bottleneck link capacity. By enabling the flow sources to regulate their data traffic based on the QCN messages from a congestion control component, the queue length at the bottleneck link may converge to an equilibrium queue length rapidly and TCP throughput performance may be enhanced substantially in a TCP incast circumstance.

FIG. 1 illustrates an example TCP incast network setting with one client requesting data from multiple servers through synchronized reads, arranged in accordance with at least some embodiments described herein.

Diagram 100 shows a basic representative network setting in which TCP throughput collapse can occur. Data may be stripped over a number of servers 108, and stored as a server request unit (SRU) 110 on each server. In order to access a particular data block, a client 102 may need to perform synchronized readings: sending request packets 106 to the storage servers containing a fragment of data block for this particular block. The client 102 may not generate data block requests until it has received the data for the current block. Upon receiving the requests, the servers 108 transmit the data (packets 106) to the receiver through a switch 104 almost concurrently. Small buffers may be exhausted by the concurrent flood of traffic, resulting in packet loss and TCP timeouts rendering switch 104 a congestion point. Therefore, TCP incast may be observed during synchronized readings for data blocks across an increasing number of servers.

TCP incast may be incited by one or more of the following conditions: (1) high-bandwidth, low-latency networks with small switch buffers; (2) clients issuing barrier-synchronized requests in parallel; (3) servers responding with a fragment of data block per request. Quantized Congestion Notification (QCN) may be an effective approach to control link rates rapidly in a datacenter environment. However, QCN performs poorly when TCP incast is observed. A system according to embodiments may mitigate the poor performance of TCP throughput with QCN due to the rate unfairness of different flows by employing a Fair Quantized Congestion Notification (FQCN) approach that ensures fairness of multiple flows sharing the link capacity.

Figure 2:
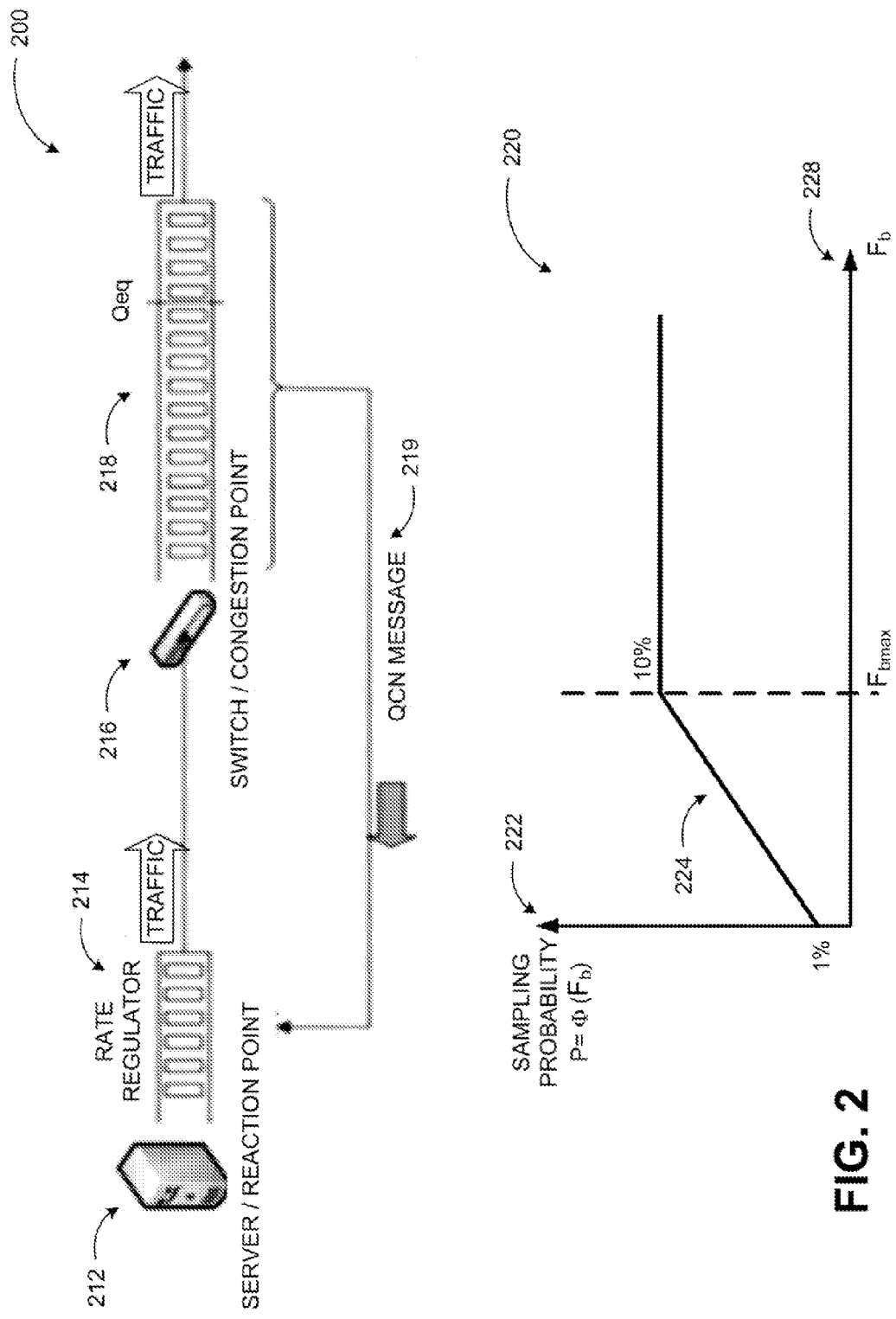
FIG. 2 illustrates an example QCN system model and a diagram of sampling probability as a function of congestion severity parameter.

FIG. 2 illustrates an example QCN system model and a diagram of sampling probability as a function of congestion severity parameter, arranged in accordance with at least some embodiments described herein.

Diagram 200 in FIG. 2 shows a QCN approach conceptually. As shown in the diagram, a QCN algorithm may include: switch or congestion point (CP) dynamics at switch 216 and rate limiter (RL) or reaction point (RP) dynamics at server or reaction point 212. At CP, a switch buffer 218 attached to an oversubscribed link may sample incoming packets and provide feedback associated with a congestion severity level to the source of the sampled packet (server/reaction point 212). While at RP, a rate regulator 214 associated with a source may decrease the sending rate based on congestion feedback message received from the CP, and increase its rate voluntarily to recover lost bandwidth and probe for extra available bandwidth. The feedback from the CP may be sent to the server/reaction point 212 in form of QCN messages 219 according to some embodiments.

One of the functions of CP may be to maintain a buffer occupancy of the switch buffer 218 at a desired operating point, $Q_{eq}$. CP may sample the incoming packets with a probability depending on the severity of congestion measured by $F_b$, and compute the severity of congestion measurement $F_b$. Diagram 220 shows the sampling probability $P=\Phi(F_b)$ 222 as a function of $|F_b|$ 228. A maximum value 224 for $F_b$, $F_{bmax}$, may be defined to ensure that the sending rate for the servers does not decrease beyond a predefined limit (e.g., 50%).

$F_b$ may be calculated as follows:

$$F_b = -(Q_{off} + w^* Q_\delta), \quad [1]$$

where $Q_{off} = Q - Q_{eq}$ and $Q_\delta = Q - Q_{old} = Q_a - Q_d$. Q denotes the instantaneous queue-size, $Q_{old}$ denotes the instantaneous queue-size of a last sampling period, $Q_a$ and $Q_d$ denote the number of arriving and departure packets between two consecutive sampling times, respectively, and w is a nonnegative constant for setting $F_{bmax}$.

$F_b$ captures a combination of queue-size excess $Q_{off}$ and rate excess Q. Thus, Q is the derivative of the queue size, and equals to the input rate less the output rate. Therefore, when $F_b$ is negative, either the buffers or the link or both may be oversubscribed and a congestion message containing the value of $F_b$, quantized to a predefined number of bits (e.g., 6), may be sent back to the source of the sampled packet; otherwise, no feedback message may be sent. Upon receiving the QCN message from the CP, the RP algorithm may adjust the sending rate by decreasing the sending rate based on the $F_b$ in the congestion feedback message received from CP, and increasing the sending rate voluntarily to recover lost bandwidth and probe for extra available bandwidth.

One challenge with the QCN congestion control algorithm may be the rate unfairness of different flows when sharing one bottleneck link. Employing QCN in TCP incast conditions, the total TCP goodput may be limited by the slowest source flow in the TCP incast. Therefore, the unfairness of QCN may decrease the TCP throughput. FQCN enhances TCP throughput to avoid or postpone the instigation of TCP incast. FQCN feeds QCN messages back to the flow sources which send packets with the sending rate over their share of the bottleneck link capacity.

Figure 3:
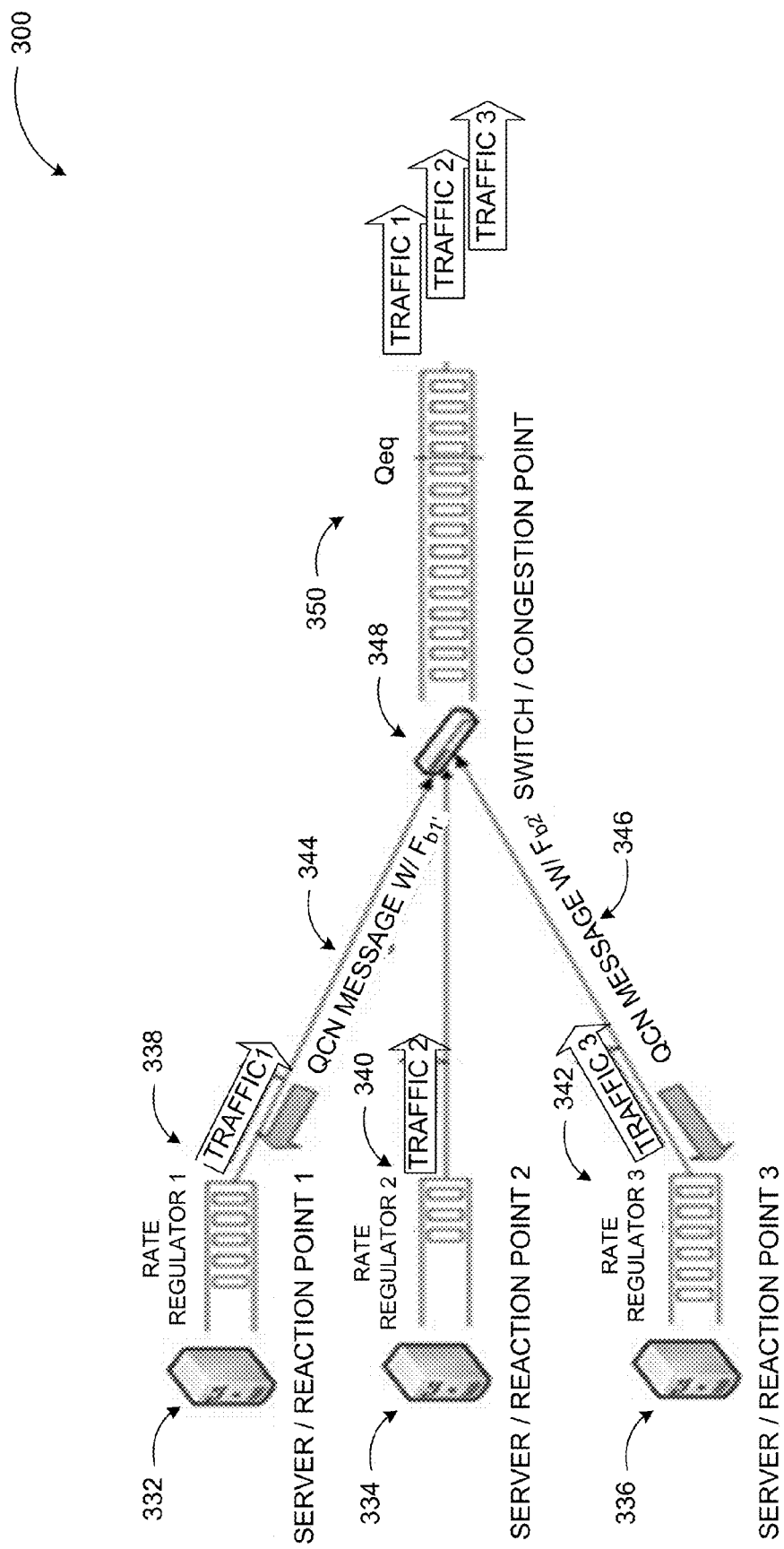
FIG. 3 illustrates an example FQCN system model with three reaction points (servers) and a congestion point (switch)

FIG. 3 illustrates an example FQCN system model with three reaction points (servers) and a congestion point (switch), arranged in accordance with at least some embodiments described herein.

As mentioned above, an FQCN algorithm according to embodiments may include a switch or congestion point (CP) dynamics at switch 348 and rate limiter (RL) or reaction point (RP) dynamics (rate regulators 338, 340, and 342). To maintain the buffer occupancy at a desired operating point ($Q_{eq}$ 350) at CP, the switch buffer attached to an oversubscribed link may sample incoming packets with a probability depending on the severity of congestion and compute the severity of congestion parameter. If the computed congestion parameter is negative, a QCN message (344 and 346) with the congestion severity parameter may be sent back to the flow sources (servers 332, 334, and 336) transmitting data packets with the sending rate over their share of the bottleneck link capacity. At each reaction point (servers 332, 334, and 336), RL dynamics may adjust the sending rate by decreasing the sending rate based on QCN message received from the CP, and increasing the sending rate voluntarily to recover lost bandwidth and probe for extra available bandwidth.

Two modules, a Byte Counter (BC) and a Rate Increase Timer, may be employed at RP for rate increases. Byte Counter may be a counter at RP for counting the number of bytes transmitted by RL. As a clock at RP employed for timing rate increase, Rate Increase Timer may allow fast bandwidth recovery when the sending rate is very low while a substantially large bandwidth becomes available. In the example configuration of diagram 300, reaction points 1 and 3 (servers 332 and 336) receive QCN messages indicating they are to adjust their data traffic to switch 348, while reaction point 2 (server 334) receives no message, because its sending rate is below its assigned capacity.

In some embodiments, FQCN may adopt substantially the same RP algorithm as that of QCN with a change in the functionality of the congestion switch. The algorithm of FQCN at CP may be summarized as follows:

A majority of FQCN operations may be substantially the same as those in QCN.

The switch may monitor the queue length and the packet arrival rate of each flow.

The switch may calculate the main measure of congestion severity level, $F_b$. If $F_b<0$, the negative QCN feedback message may be sent back to the flow sources, which send packets with the sending rate over their shares of the link capacity. For each QCN feedback message, the congestion parameter may calculated as follows:

$$F_b(i) = \frac{A_i}{\sum_{k=1}^{N'} A_k} F_b, \quad [2]$$

where N' is the total number of overrate flows, meaning that the source sending rate is larger than its share of the link capacity, and $A_k$ is the total number of the received packets from the $k^{th}$ overrate source flow. Thus, the congestion parameter $F_b(i)$ in each negative QCN feedback message is proportional to $F_b$.

As discussed previously, the FQCN congestion control mechanism may be separated into two parts: switch control and source control. At the switch, by assuming that the queue length is differentiable, the switch dynamics may be given by:

$$\frac{dq(t)}{dt} = \sum_{i=1}^{N} CR_i(t) - C_l, \quad [3]$$

where q(t) is the instantaneous queue length at the switch, $CR_i(t)$ denotes the source i's current rate, N is the total number of sources sharing the link l, and $C_l$ is the capacity of link l.

Based on Equation [1], the congestion parameter $F_b(t)$ generated by link l may be calculated by:

$$F_b(t) = -(q(t) - Q_{eq}) - \frac{w}{C_i * p(t)} \left( \sum_{i=1}^{N} CR_i(t) - C_l \right), \quad [4]$$

where p(t) is the time-varying sampling probability at the switch. If the calculated $F_b(t)$ is negative, each feedback message may be sent back to the individual source of the overrate flows with congestion parameter calculated by Equation [2].

The sampling probability may be updated as follows:

$$p(t) = \phi(F_b(t)), \quad [5]$$

where Φ is the probability function as discussed in conjunction with diagram 220 of FIG. 2.

Considering a "dumbbell topology" with N sources sharing a single link, the evolutions of source i's target rate and current rate denoted by $TR_i$ and $CR_i$ may be given by the following differential equations, respectively:

$$\frac{dTR_i}{dt} = -(TR_i(t) - CR_i(t))CR_i(t-\tau)p(t-\tau) + \quad [6]$$
$$R_{AI}CR_i(t-\tau)\frac{(1-p(t-\tau))^{500}p(t-\tau)}{(1-p(t-\tau))^{-100}-1},$$

$$\frac{dCR_i}{dt} = -G_d\left(F_b(t-\tau)\frac{A_t}{\sum_{k=1}^{N'} A_k}\right)CR_i(t-\tau)p(t-\tau) + \quad [7]$$
$$\left(\frac{TR_i(t-\tau) - CR_i(t-\tau)}{2}\right)\frac{CR_i(t-\tau)p(t-\tau)}{(1-p(t-\tau))^{-100}-1}$$

where $A_i$ is the total number of the received bits from the ith flow since the last sampling packet, and N' is the total number of overrate flows.

The fluid model discussed above corresponds to a simplified FQCN algorithm with the Rate Increase Timer and its transient evolution disabled. From the analysis of Equation [7], with multiple sources sharing a link, FQCN is max-min fair. Without a positive feedback message, FQCN may always try to maximize the link utilization. Without considering stochastic perturbations and time lags, the FQCN control system may be determined to be stable: the rate of each source converges to a unique rate that maximizes the link utilization.

Figure 4:
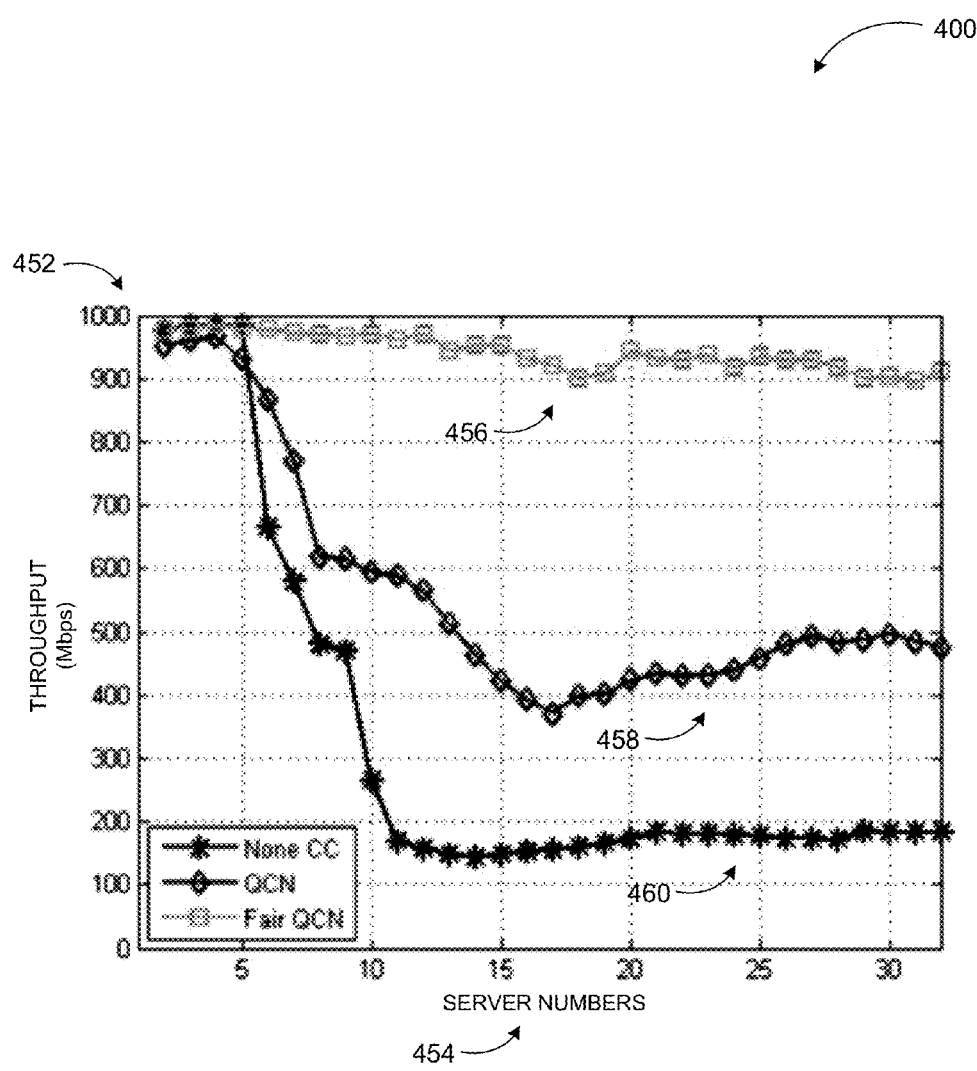
FIG. 4 illustrates an example diagram comparing TCP throughputs without congestion control, with QCN control, and with FQCN control.

FIG. 4 illustrates an example diagram comparing TCP throughputs without congestion control, with QCN control, and with FQCN control, arranged in accordance with at least some embodiments described herein.

The effects of QCN and FQCN on the TCP incast may be tested employing a test application that performs synchronized reads over TCP in ns-2 to model with a typical striped file system data transfer operation. Diagram 400 shows graphs of FQCN applied test conditions 456, QCN applied test conditions 458, and no congestion control applied test conditions 460 in case of TCP incast comparing throughput 452 (in Mbps) and number of servers 454 providing data traffic. For the example simulation, a link capacity of 1 Gbps, a round trip time (RTT) of 100 s, a default packet size of 1000 bytes, a 64 Kb buffer size of the bottleneck link, a queue length of 64 packets, and an equilibrium queue size of 22 packets for both the QCN and FQCN congestion control algorithms may be used.

QCN can effectively control link rates rapidly in a datacenter environment. However, it performs poorly in the TCP incast setup. The TCP goodput decreases with the increase of the number of servers, reducing to around 400 Mbps with 16 servers. On the other hand, FQCN is able to mitigate TCP incast without substantial degradation of the goodput, maintaining a high goodput of around 900 Mbps even with a large number of servers, as shown in diagram 400. The poor performance of TCP throughput with QCN may be attributed to the rate unfairness of different flows. QCN initially reacts with timeouts because at the very beginning, all source flows send packets at the link rate resulting in rapid queue built up at the switch. If the switch buffer is overflowed, packets are dropped, thus leading to TCP timeouts. QCN effectively regulates sending rates of TCP flows and prevents TCP timeouts from occurring. After TCP timeouts begin to occur, the fairness issue plays a substantial role in a synchronized reading, causing variations in QCN flow rates to affect the overall performance. Thus, by addressing fair treatment of flow sources, the FQCN approach enhances network performance.

Figure 5:
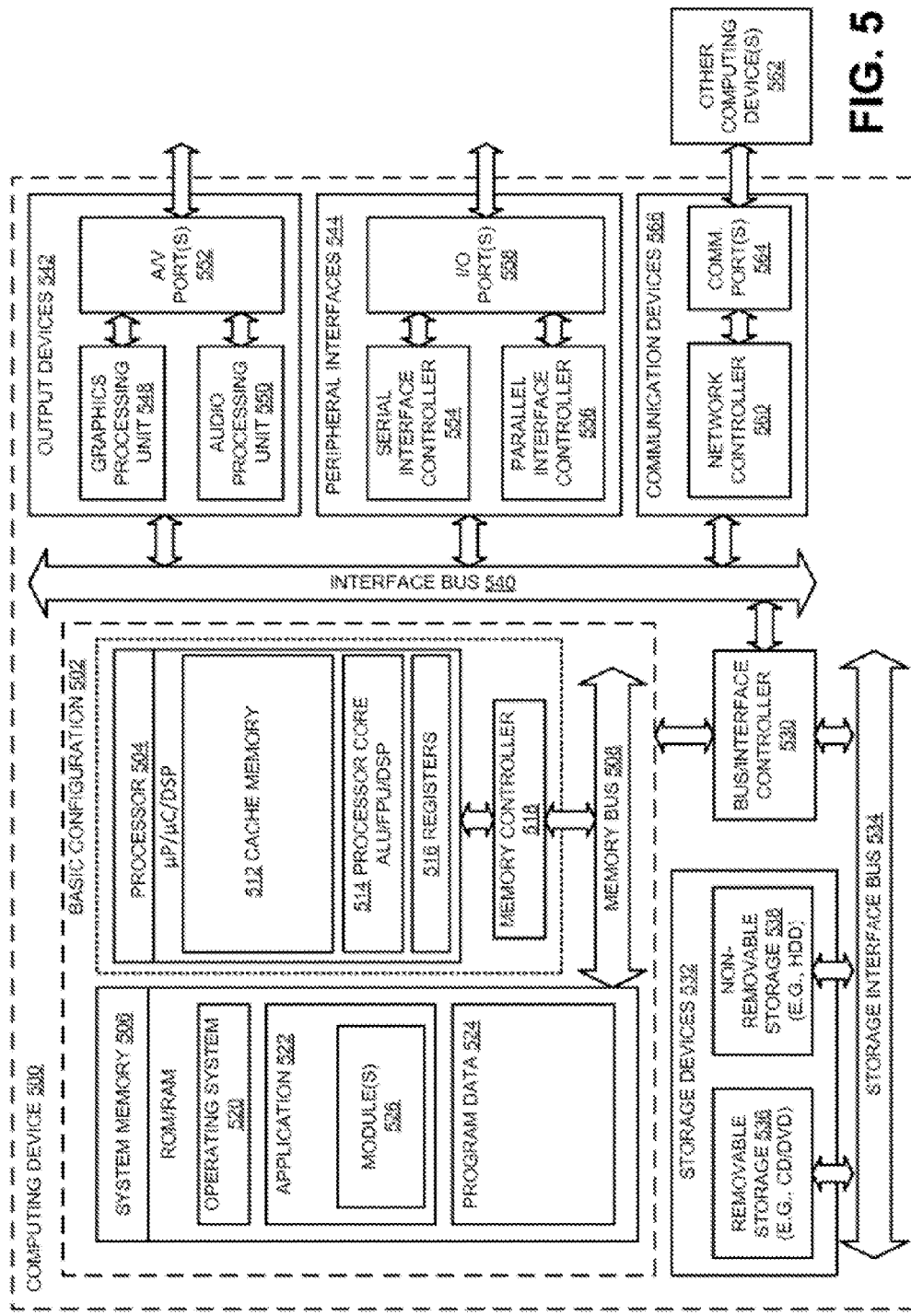
FIG. 5 illustrates a general purpose computing device, which may be used to implement FQCN for mitigating TCP throughput collapse in data center networks.

FIG. 5 illustrates a general purpose computing device, which may be used to implement FQCN for mitigating TCP throughput collapse in data center networks, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, an application 522 with module(s) 526, and program data 524. In an operation, application 522 may control operations of a switch in a data center network and monitor incoming data traffic from servers. Application 522 may also compute a congestion severity metric based on queue size excess and queue rate size excess. If the congestion severity parameter is determined to have negative value, the application may cause a QCN message to be transmitted to the servers containing the congestion severity parameter such that the servers can regulate their traffic for optimized network operation as described in conjunction with FIG. 1 through FIG. 4 above. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 566 to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a physical server, virtual server, a computing cloud, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way of implementing a method is by machine operations, of devices of the type described in the present disclosure. Another optional way of implementing a method is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
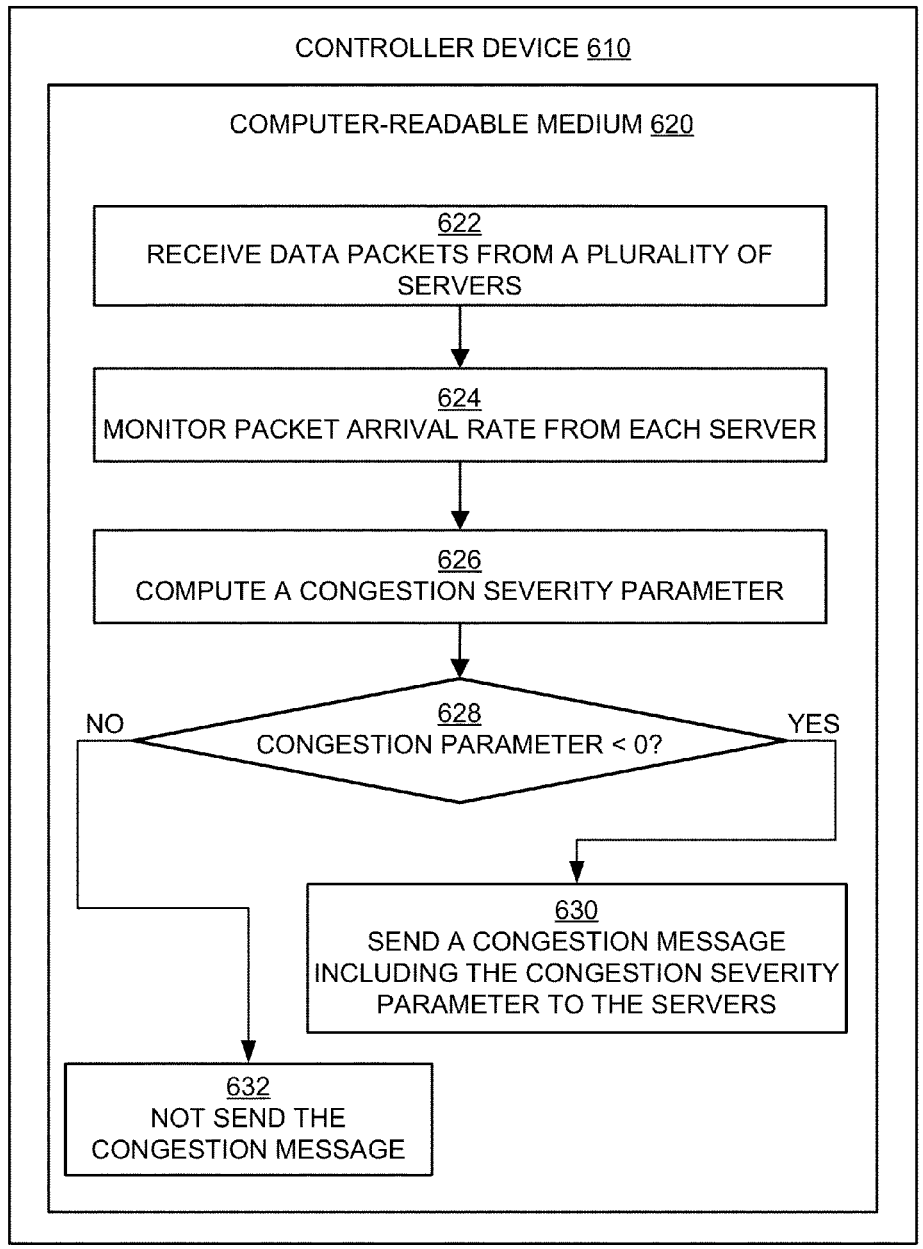
FIG. 6 is a flow diagram illustrating an example method for employing FQCN to mitigate TCP throughput collapse in data center networks that may be performed in a computing device such as device 500 in FIG. 5.

FIG. 6 is a flow diagram illustrating an example method for employing FQCN to mitigate TCP throughput collapse in data center networks that may be performed in a computing device such as device 500 in FIG. 5, arranged in accordance with at least some embodiments described herein. The method may include one or more operations, functions or actions as is illustrated by blocks 622, 624, 626, 628, 630 and/or 632. The operations described in blocks 622 through 632 may also be stored as computer-executable instructions in a computer-readable medium 620 such as data storage devices 532 of the computing device 500 illustrated in FIG. 5 and executed by a controller device 610 such as processor 504 of computing device 500 of FIG. 5.

The process of FIG. 6 may begin with operation 622, "RECEIVE DATA PACKETS FROM A PLURALITY OF SERVERS." At operation 622, switch 348 may receive data traffic from various servers 332, 334, and 336. Operation 622 may be followed by operation 624, "MONITOR PACKET ARRIVAL RATE FROM EACH SERVER." At operation 624, switch 348 may monitor incoming data traffic from the servers and determine congestion level at the switch.

Operation 624 may be followed by operation 626, "COMPUTE A CONGESTION SEVERITY PARAMETER." At operation 626, switch 348 may compute congestion severity parameter based on queue size excess and queue rate size excess. The congestion severity parameter may be used to enable each server regulate its traffic to the switch for optimized network performance.

Operation 626 may be followed by decision operation 628, "CONGESTION PARAMETER<0?" At decision operation 628, switch 348 may determine whether the computed congestion severity parameter has a negative value or a positive value.

If the congestion severity parameter is determined to have a negative value at decision operation 628, switch 348 may transmit a QCN message to the servers with the congestion severity parameter at operation 630 "SEND A CONGESTION MESSAGE INCLUDING THE CONGESTION SEVERITY PARAMETER TO THE SERVERS." Switch 348 may thereby enable each server can regulate its traffic by reducing or increasing it depending on the congestion level at the switch.

If the congestion severity parameter is determined to have a positive value at decision operation 628, switch 348 may forgo transmitting the QCN message to the servers with the congestion severity parameter at operation 632 "NOT SEND THE CONGESTION MESSAGE."

The operations included in the above described process are for illustration purposes. Employing FQCN to mitigate TCP throughput collapse in data center networks may be implemented by similar processes with fewer or additional operations. In some examples, the operations may be performed in a different order. In some other examples, various operations may be eliminated. In still other examples, various operations may be divided into additional operations, or combined together into fewer operations.

Figure 7:
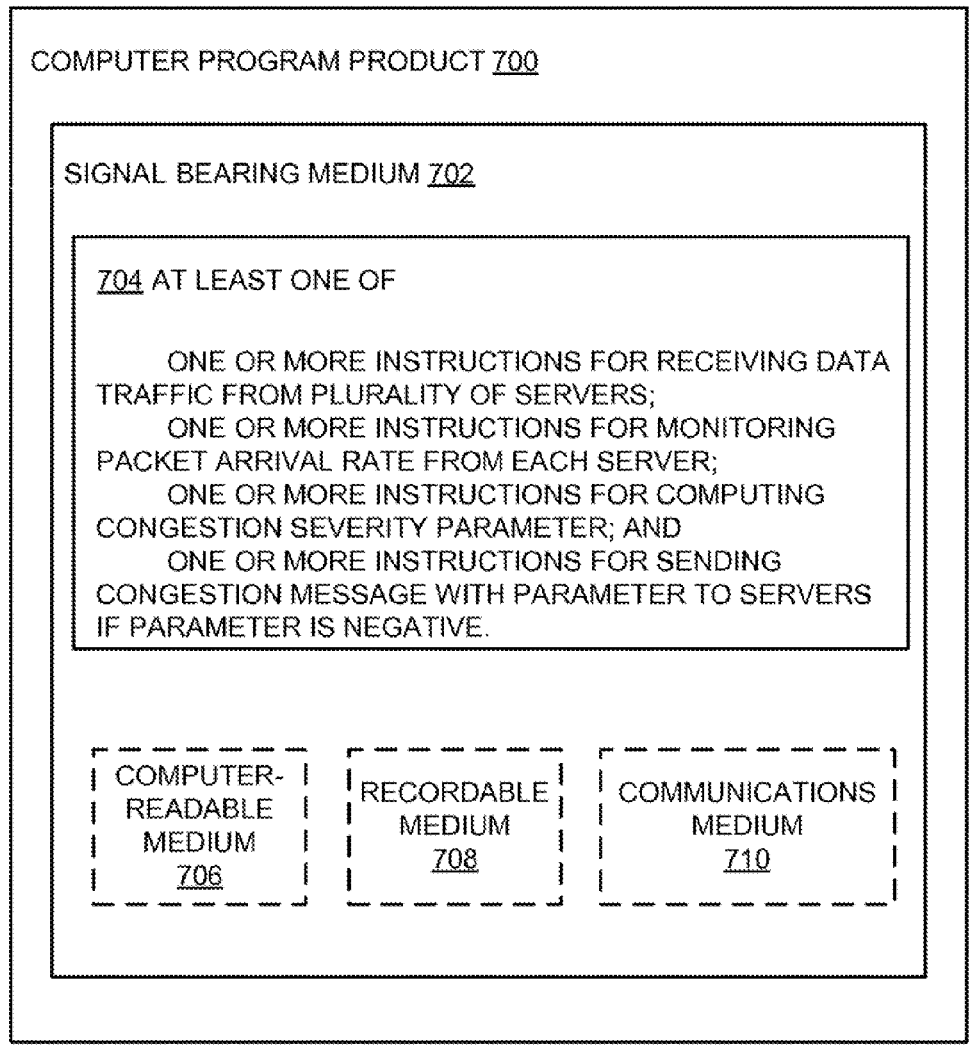
FIG. 7 illustrates a block diagram of an example computer program product, all arranged in accordance with at least some embodiments described herein.

FIG. 7 illustrates a block diagram of an example computer program product, arranged in accordance with at least some embodiments described herein. In some examples, as shown in FIG. 7, computer program product 700 may include a signal bearing medium 702 that may also include machine readable instructions 704 that, when executed by, for example, a processor, may provide the functionality described above with respect to FIG. 5. For example, referring to the computing device 500, processor 504 may undertake one or more of the tasks shown in FIG. 7 in response to instructions 704 conveyed to the processor 504 by the medium 702 to perform actions associated with employing FQCN to mitigate TCP throughput collapse in data center networks as described herein. Some of those instructions may be include receiving data traffic from plurality of servers, monitoring packet arrival rate from each server, computing congestion severity parameter, and sending congestion message with parameter to servers if parameter is negative.

In some implementations, the signal bearing medium 702 depicted in FIG. 7 may encompass a computer-readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). For example, program product 700 may be conveyed to one or more modules of the processor 604 by an RF signal bearing medium, where the signal bearing medium 702 is conveyed by a wireless communications medium 710 (e.g., a wireless communications medium conforming with the IEEE 802.11 standard).

The present disclosure generally presents a data center network, a congestion control component, and methods for employing fair quantized congestion notification (FQCN) to mitigate transport control protocol (TCP) throughput collapse in data center networks.

An example data center network may include multiple reaction points configured to send data packets at a sending rate over respectively assigned shares of link capacity and a congestion point receiving data traffic from the plurality of reaction points. The congestion point may monitor packet arrival rate from each reaction point and feed congestion messages to the reaction points, the messages including a congestion severity parameter for enabling the reaction points to regulate the respective sending rates of the reaction points.

According to some examples, the reaction points may be servers and the congestion point is a switch. The congestion point may also maintain a buffer occupancy at a predefined operating point. A switch buffer may be attached to an oversubscribed link and the congestion point may further sample the incoming data packets with a probability depending on the severity of congestion and compute a severity of congestion parameter. If the computed congestion severity parameter is negative, the congestion point may send a congestion message including the congestion severity parameter to the reaction points.

According to other examples, each reaction point may adjust the sending rate by decreasing the sending rate based on congestion feedback message received from congestion point and increasing the sending rate voluntarily to recover lost bandwidth and probe for extra available bandwidth. Each reaction point may include a byte counter for counting a number of bytes transmitted by each reaction point. Each reaction point may further include a rate increase timer to enable fast bandwidth recovery when the sending rate is very low and increased bandwidth becomes available. The rate increase timer may be a clock at a reaction point.

According to further examples, the congestion point may monitor a queue length and identify an over-rated data flow from a reaction point with a sending rate that is larger than an assigned link capacity to the reaction point. The congestion severity parameter, $F_b$, may be computed by:

$$F_b = -(Q_{off} + w \cdot Q_\delta),$$

where $Q_{off}$ is queue a size excess and $Q_\delta$ is a rate size excess. Congestion severity parameters, $F_b(i)$, for a plurality of reaction points may be computed by:

$$F_b(i) = \frac{A_i}{\sum_{k=1}^{N'} A_k} F_b,$$

where N' is a total number of overrate flows and A is a total number of received data packets from a $k^{th}$ overrated reaction point. The congestion messages may be Quantized Congestion Notification (QCN) messages.

An example method for controlling data traffic congestion at a data center network may include receiving data packets from a plurality of reaction points at a sending rate over respectively assigned shares of link capacity; monitoring packet arrival rate from each reaction point at a congestion point receiving data traffic from the plurality of reaction points; and feeding congestion messages to the reaction points, the messages including a congestion severity parameter for enabling the reaction points to regulate the respective sending rates of the reaction points.

According to some examples, the reaction points may be servers and the congestion point is a switch. The method may also include maintaining a buffer occupancy at a predefined operating point. A switch buffer may be attached to an oversubscribed link. The method may further include sampling the incoming data packets with a probability depending on the severity of congestion and computing a severity of congestion parameter. If the computed congestion severity parameter is negative, the method may include sending a congestion message including the congestion severity parameter to the reaction points.

According to other examples, the method may include causing the reaction points to adjust the sending rate by decreasing the sending rate based on congestion feedback message received from congestion point and increasing the sending rate voluntarily to recover lost bandwidth and probe for extra available bandwidth. Each reaction point may include a byte counter for counting a number of bytes transmitted by each reaction point. Each reaction point may further include a rate increase timer to enable fast bandwidth recovery when the sending rate is very low and increased bandwidth becomes available.

According to further embodiments, the method may further include monitoring a queue length and identifying an over-rated data flow from a reaction point with a sending rate that is larger than an assigned link capacity to the reaction point. The method may also include computing the congestion severity parameter, $F_b$, by:

$$F_b = -(Q_{off} + w \cdot Q_\delta),$$

where $Q_{off}$ is queue a size excess and $Q_\delta$ is a rate size excess. The method may further include computing congestion severity parameters, $F_b(i)$, for a plurality of reaction points by:

$$F_b(i) = \frac{A_i}{\sum_{k=1}^{N'} A_k} F_b,$$

where N' is a total number of overrate flows and A is a total number of received data packets from a $k^{th}$ overrated reaction point. The congestion messages may be Quantized Congestion Notification (QCN) messages.

An example congestion control component for a data center network capable of controlling data traffic congestion may include a switch configured to receive data packets from a plurality of servers at a sending rate over respectively assigned shares of link capacity, monitor packet arrival rate from each server, and feed congestion messages to the server, the messages including a congestion severity parameter for enabling the servers to regulate the respective sending rates of the servers.

According to some examples, the congestion control component may further include a switch buffer attached to an oversubscribed link, and may maintain a switch buffer occupancy at a predefined operating point. The switch may also sample the incoming data packets with a probability depending on the severity of congestion and compute a severity of congestion parameter. If the computed congestion severity parameter is negative, the switch may send a congestion message including the congestion severity parameter to the servers. The switch may further cause each server to adjust the sending rate by decreasing the sending rate based on congestion feedback message received from the congestion control component and increasing the sending rate voluntarily to recover lost bandwidth and probe for extra available bandwidth.

According to other examples, each server may include a byte counter for counting a number of bytes transmitted by each server. Each server may further include a rate increase timer to enable fast bandwidth recovery when the sending rate is very low and increased bandwidth becomes available. The switch may also monitor a queue length and identify an over-rated data flow from a server with a sending rate that is larger than an assigned link capacity to the server.

The congestion severity parameter, $F_b$, may be computed by:

$$F_b = -(Q_{off} + w \cdot Q_\delta),$$

where $Q_{off}$ is queue a size excess and $Q_\delta$ is a rate size excess. Congestion severity parameters, $F_b(i)$, for a plurality of servers may be computed by:

$$F_b(i) = \frac{A_i}{\sum_{k=1}^{N'} A_k} F_b,$$

where N' is a total number of overrate flows and A is a total number of received data packets from a $k^{th}$ overrated server. The congestion messages are Quantized Congestion Notification (QCN) messages.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting matrix factorization parameters such as the predetermined threshold for terminating iterations).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A data center network to control data traffic congestion, the data center network comprising:
   a plurality of reaction points, comprising a processor, configured to send data packets at a send rate over respectively assigned shares of link capacity; and
   a congestion point, comprising a processor, configured to receive data traffic from the plurality of reaction points, the congestion point configured to:
      monitor packet arrival rate from each of the plurality of reaction points; and
      feed congestion messages to the plurality of reaction points, the congestion messages including a congestion severity parameter, $F_b$, to enable the plurality of reaction points to regulate respective send rates of each of the plurality of reaction points, wherein the congestion severity parameter is computed by $$F_b = -(Q_{off} + w^* Q_\delta),$$

where $Q_{off}$ is a queue size excess, w is a nonnegative constant to set a maximum value of the $F_b$, and $Q_\delta$ is a rate size excess, and wherein congestion severity parameters, $F_b(i)$, for the plurality of reaction points are computed by $$F_b(i) = \frac{A_i}{\sum_{k=1}^{N'} A_k} F_b,$$

where N' is a total number of overrate flows and A is a total number of received data packets from a $k^{th}$ overrated reaction point.

2. The data center network of claim 1, wherein the plurality of reaction points include servers and the congestion point includes a switch.

3. The data center network of claim 1, wherein the congestion point is further configured to maintain a buffer occupancy at a predefined operating point.

4. The data center network of claim 3, wherein a switch buffer is attached to an oversubscribed link and the congestion point is further configured to:
   sample the data packets with a probability dependent on a severity of congestion; and
   compute the congestion severity parameter.

5. The data center network of claim 4, wherein the congestion point is further configured to:
   in response to a determination that the computed congestion severity parameter is negative, send the congestion messages including the congestion severity parameter to the plurality of reaction points.

6. The data center network of claim 1, wherein each of the plurality of reaction points is further configured to:
   adjust the send rate by:
      decrease of the send rate based on the congestion messages received from congestion point; and
      increase of the send rate voluntarily to recover lost bandwidth and probe for extra available bandwidth.

7. The data center network of claim 1, wherein each of the plurality of reaction points includes a byte counter to count a number of bytes transmitted by each of the plurality of reaction points.

8. The data center network of claim 1, wherein each of the plurality of reaction points includes a rate increase timer to enable bandwidth recovery after the send rate is decreased and increased bandwidth becomes available.

9. The data center network of claim 8, wherein the rate increase timer includes a clock at each of the plurality of reaction points.

10. The data center network of claim 1, wherein the congestion point is further configured to monitor a queue length and to identify an over-rated data flow from one or more of the plurality of reaction points with a send rate that is larger than an assigned link capacity to the one or more of the plurality of reaction points.

11. The data center network of claim 1, wherein the congestion messages are quantized congestion notification (QCN) messages.

12. A method to control data traffic congestion at a data center network, the method comprising:
receiving data packets from a plurality of reaction points at a send rate over respectively assigned shares of link capacity;
monitoring packet arrival rate from each of the plurality of reaction points at a congestion point that receives data traffic from the plurality of reaction points; and
feeding congestion messages to the plurality of reaction points, the congestion messages including a congestion severity parameter, $F_b$, to enable the plurality of reaction points to regulate respective send rates of each of the plurality of reaction points, wherein the congestion severity parameter is computed by $$F_b = -(Q_{off} + w*Q_\delta)$$

where $Q_{off}$ is a queue size excess, w is a nonnegative constant to set a maximum value of the Fb, and $Q_\delta$ is a rate size excess, and wherein congestion severity parameters, $F_b(i)$, for the plurality of reaction points are computed by, $$F_b(i) = \frac{A_i}{\sum_{k=1}^{N'} A_k} F_b,$$

where N' is a total number of overrate flows and A is a total number of received data packets from a $k^{th}$ overrated reaction point.

13. The method of claim 12, wherein the plurality of reaction points include servers and the congestion point includes a switch.

14. The method of claim 12, further comprising:
maintaining a buffer occupancy at a predefined operating point.

15. method of claim 14, wherein a switch buffer is attached to an oversubscribed link.

16. The method of claim 15, further comprising:
sampling the received data packets with a probability dependent on a severity of congestion; and
computing the congestion severity parameter.

17. The method of claim 16, further comprising:
in response to a determination that the computed congestion severity parameter is negative, sending the congestion messages including the congestion severity parameter to the plurality of reaction points.

18. The method of claim 12, further comprising:
causing the plurality of reaction points to adjust the send rate by:
decreasing the send rate based on the congestion feedback messages received from congestion point; and
increasing the send rate voluntarily to recover lost bandwidth and probe for extra available bandwidth.

19. The method of claim 12, wherein each of the plurality of reaction points includes a byte counter to count a number of bytes transmitted by each of the plurality of reaction points.

20. The method of claim 12, wherein each of the plurality of reaction points includes a rate increase timer to enable bandwidth recovery after the send rate is decreased and increased bandwidth becomes available.

21. The method of claim 12, further comprising:
monitoring a queue length and identifying an over-rated data flow from one or more of the plurality of reaction points with a send rate that is larger than an assigned link capacity to the one or more of the plurality of reaction points.

22. The method of claim 12, wherein the congestion messages are quantized congestion notification (QCN) messages.

23. A congestion control component for a data center network capable to control data traffic congestion, the congestion control component comprising:
a switch configured to:
receive data packets from a plurality of servers at a send rate over respectively assigned shares of link capacity;
monitor packet arrival rate from each of the plurality of servers; and
feed congestion messages to the plurality of servers, the congestion messages including a congestion severity parameter, $F_b$, to enable the plurality of servers to regulate respective send rates of each of the plurality of servers, wherein the congestion severity parameter is computed by $$F_b = -(Q_{off} + w*Q_\delta),$$

where $Q_{off}$ is a queue size excess, w is a nonnegative constant to set a maximum value of the $F_b$, and $Q_\delta$ is a rate size excess and wherein congestion severity parameters, $F_b(i)$, for the plurality of servers are computed by $$F_b(i) = \frac{A_i}{\sum_{k=1}^{N'} A_k} F_b,$$

where N' is a total number of overrate flows and A is a total number of received data packets from a $k^{th}$ overrated reaction point.

24. The congestion control component of claim 23, further comprising a switch buffer attached to an oversubscribed link.

25. The congestion control component of claim 24, wherein the switch buffer is configured to maintain a switch buffer occupancy at a predefined operating point.

26. The congestion control component of claim 25, wherein the switch is further configured to:
sample the received data packets with a probability dependent on a severity of congestion; and
compute the congestion severity parameter.

27. The congestion control component of claim 26, wherein the switch is further configured to:

in response to a determination that the computed congestion severity parameter is negative, send the congestion messages including the congestion severity parameter to the plurality of servers.

28. The congestion control component of claim 23, wherein the switch is further configured to:
cause each of the plurality of servers to adjust the send rate by:
decrease of the send rate based on the congestion messages received from the congestion control component; and
increase of the send rate voluntarily to recover lost bandwidth and probe for extra available bandwidth.

29. The congestion control component of claim 23, wherein each of the plurality of servers includes a byte counter to count a number of bytes transmitted by each of the plurality of servers.

30. The congestion control component of claim 23, wherein each of the plurality of servers includes a rate increase timer to enable bandwidth recovery after the send rate is decreased and increased bandwidth becomes available.

31. The congestion control component of claim 23, wherein the switch is further configured to monitor a queue length and to identify an over-rated data flow from one or more of the plurality of servers with a send rate that is larger than an assigned link capacity to the one or more of the plurality of servers.

32. The congestion control component of claim 23, wherein the congestion messages are quantized congestion notification (QCN) messages.

33. A system configured to control data traffic congestion, the system comprising:
a plurality of servers configured to send data packets at a send rate over respectively assigned shares of link capacity; and
a switch configured to receive data traffic from the plurality of servers, the switch configured to:
monitor packet arrival rate from each of the plurality of servers;
compute a severity of congestion measurement for each of the plurality of servers based on a queue size excess, a rate size excess, and a nonnegative constant to set a maximum value of the severity of congestion measurement;
in response to a determination that the severity of congestion measurement is negative for one or more of the plurality of servers, feed congestion messages to one or more of the plurality of servers, the congestion messages including a congestion severity parameter to enable the one or more of the plurality of servers to regulate respective send rates of the one or more of the plurality of servers, wherein
the congestion severity parameter is computed based on the severity of congestion measurement, a total number of overrate flows, and a total number of received data packets from a $k^{th}$ overrated server;
compute the severity of congestion measurement by $$F_b = -(Q_{off} + w*Q_\delta)$$

where $F_b$ is the severity of congestion measurement $Q_{off}$ is the queue size excess w is the nonnegative constant to set the maximum value of the $F_b$ and $Q_{67}$ is the rate size excess; and
compute the congestion severity parameter by $$F_b(i) = \frac{A_i}{\sum_{k=1}^{N'} A_k} F_b,$$

where $F_b(i)$ is the congestion severit parameter $F_b$ is the severity of congestion measurement, N' is the total number of overrate flows, and A is the total number of received data packets from the $k^{th}$ overrated server.

34. The system of claim 33, wherein the switch is further configured to:
in response to a determination that the severity of congestion measurement is positive for at least one of the plurality of servers, forgo transmission of the congestion messages to the at least one of the plurality of servers.

35. The system of claim 33, wherein each of the plurality of servers are further configured to:
adjust the send rate by:
decrease of the send rate based on the congestion messages received from switch; and
increase of the send rate voluntarily to recover lost bandwidth and probe for extra available bandwidth.

* * * * *